US009754487B1

(12) United States Patent
Woodard et al.

(10) Patent No.: US 9,754,487 B1
(45) Date of Patent: Sep. 5, 2017

(54) PARKING INFORMATION AGGREGATION PLATFORM

(71) Applicant: Google Inc., Mountain View, CA (US)

(72) Inventors: Jason Woodard, Astoria, NY (US); Joseph Catalano, Farmingdale, NY (US); Ryan Kotler, Brooklyn, NY (US); Adam Richard Rogal, New York, NY (US)

(73) Assignee: Google Inc., Mountain View, CA (US)

( * ) Notice: Subject to any disclaimer, the term of this patent is extended or adjusted under 35 U.S.C. 154(b) by 288 days.

(21) Appl. No.: 14/610,113

(22) Filed: Jan. 30, 2015

Related U.S. Application Data

(63) Continuation of application No. 14/170,785, filed on Feb. 3, 2014, now Pat. No. 8,947,261, which is a continuation of application No. 13/452,162, filed on Apr. 20, 2012, now Pat. No. 8,665,118.

(60) Provisional application No. 61/478,057, filed on Apr. 21, 2011.

(51) Int. Cl.

| | |
|---|---|
| ***B60Q 1/48*** | (2006.01) |
| ***G08G 1/14*** | (2006.01) |
| ***G06Q 50/30*** | (2012.01) |

(52) U.S. Cl.
CPC ............ *G08G 1/143* (2013.01); *G06Q 50/30* (2013.01)

(58) Field of Classification Search
CPC ............................ G08G 1/14; G01C 31/3476
USPC ..... 340/932.2, 905, 933, 937, 942; 701/426, 701/533, 537, 540
See application file for complete search history.

(56) References Cited

U.S. PATENT DOCUMENTS

| | | | |
|---|---|---|---|
| 6,340,935 B1 | 1/2002 | Hall | |
| 6,865,539 B1 | 3/2005 | Pugliese, III | |
| 7,135,991 B2 | 11/2006 | Slemmer et al. | |
| 7,516,010 B1 | 4/2009 | Kaplan et al. | |
| 7,783,530 B2 | 8/2010 | Slemmer et al. | |
| 7,805,239 B2 | 9/2010 | Kaplan et al. | |
| 2011/0109480 A1* | 5/2011 | Huijnen ............ | G01C 21/3476 340/932.2 |
| 2012/0056758 A1* | 3/2012 | Kuhlman ................ | G08G 1/14 340/932.2 |

* cited by examiner

*Primary Examiner* — Tai T Nguyen
(74) *Attorney, Agent, or Firm* — Fish & Richardson P.C.

(57) ABSTRACT

This document describes systems and techniques that may be used to aggregate information about open parking spots from various different parking providers or organizations.

18 Claims, 8 Drawing Sheets

PARKING INFORMATION AGGREGATION PLATFORM

CROSS-REFERENCE TO RELATED APPLICATIONS

This application claims priority to U.S. Provisional Application No. 61/478,057, filed on Apr. 21, 2011, the entire contents of which are hereby incorporated by reference.

TECHNICAL FIELD

This document relates to obtaining and handling information about parking spaces that may be open or occupied, such as by aggregating information from multiple parking operators and making it available to third parties.

BACKGROUND

Automobile drivers know that finding an open parking space can be extremely difficult at times. For example, in urban areas, open parking—whether at meters, in open lots, or in ramps—can be rare and fleeting, particularly right before a major event such as a ball game. The simultaneous presence of an open parking spot and a person looking for parking but who does not know about the spot, is a true dead weight loss—the user wastes time looking, and the parking operator loses revenue.

Parking operators have tried various techniques to advertise the fact that they have open parking spaces. For example, neon signs may be posted at lots or ramps to indicate that there are open spaces or that there are no open spaces. Also, ramp or lot operators may post information and make it available over the internet to indicate whether parking is available at certain locations.

SUMMARY

This document describes systems and techniques that may be used to aggregate information about open parking spots from various different parking providers or organizations. For example, a single company (or a municipality) that operates multiple ramps in a city would be a single organization, while a corporation that operates ramps in the city would be another organization. Each of the providers may operate to generate real-time parking information that indicates the availability of parking at its facilities (which may be described as open inventory), and may be permitted to format that data in a way that it sees fit. Each of the providers may then provide the data periodically to a central aggregation service, either by unilaterally pushing the data or by returning the data in response to a request from the service. Each of the providers may also make their particular data available to other parties.

The central aggregation service may then aggregate the received data and make it available to third parties, such as users of mobile computing devices. In aggregating the data, the service may reformat the data as it is received from each of the particular parking providers, so that it may be stored in a single database or data structure. The service may perform analysis on such aggregated data, such as by determining trends from the data and using the trends to produce predictive data. For example, a service may analyze patterns in parking inventory in a certain geographic area at particular times of day, and may generate predictive models so as to determine likely availability of parking for corresponding locations and times in the future. Also, aggregated data from parking providers may be used to identify activity outside of parking facilities. For example, if parking inventory in a geographic area is increasing quickly, such information may be used to determine that surrounding roadways will be filling up quickly and that traffic in the area may become congested.

Results of such aggregation and analyses may be used in various manners. For example, users of mobile devices may submit queries that identify their current geographic locations, and the aggregation service may return data for generating a map that is annotated with icons that indicate current parking availability for various parking providers around the requesting users. The annotations may also include information about traffic conditions in the area, such as by showing colored lines on roadways near parking areas that have had a quick increase in inventory (e.g., thick red lines). Also, the data may be used for generating promotional information, such as serving coupons for a snack (e.g., a free ice cream cone) to users of mobile devices in an area where parking inventory is quickly increasing.

The service may also correlate a particular change that is seen in a system with a particular user. For example, when the service is notified by a particular parking provider that a parking spot has been filled (e.g., that inventory has decreased by one spot), the service may check for the presence of users in the area of the parking facility who are currently logged into the service and have agreed to be provided with certain information from the service. The service may then send to the user a message, e.g., that includes a coupon for a store near the parking facility.

Any of the implementations discussed above may also be implemented as one or more tangible non-transitory computer-readable storage mediums having recorded thereon instructions that when executed perform various operations, including the various operations discussed above.

The details of one or more embodiments are set forth in the accompanying drawings and the description below. Various advantages can be provided by certain implementations. For example, the disclosed systems and techniques can allow parking providers to get more accurate and up-to-date information regarding available parking spots to users. This can help parking providers more quickly and reliably fill available parking spaces, and/or it can help users more easily locate a place to park. In another example, parking providers can readily participate with an aggregation service by being able to provide parking information to the aggregation service in any of a variety of formats. By not having to modify the format in which their systems report parking information and/or communicate with other computing devices, parking providers can have fewer barriers to entry into an aggregation service and can more readily participate.

Other features and advantages will be apparent from the description and drawings, and from the claims.

DESCRIPTION OF DRAWINGS

FIG. 8 shows a table that describes an example set of properties that can be provided as part of a location feed.

FIG. 9 shows a table that describes example HTTP header information.

Like reference symbols in the various drawings indicate like elements.

DETAILED DESCRIPTION

Figure 1:
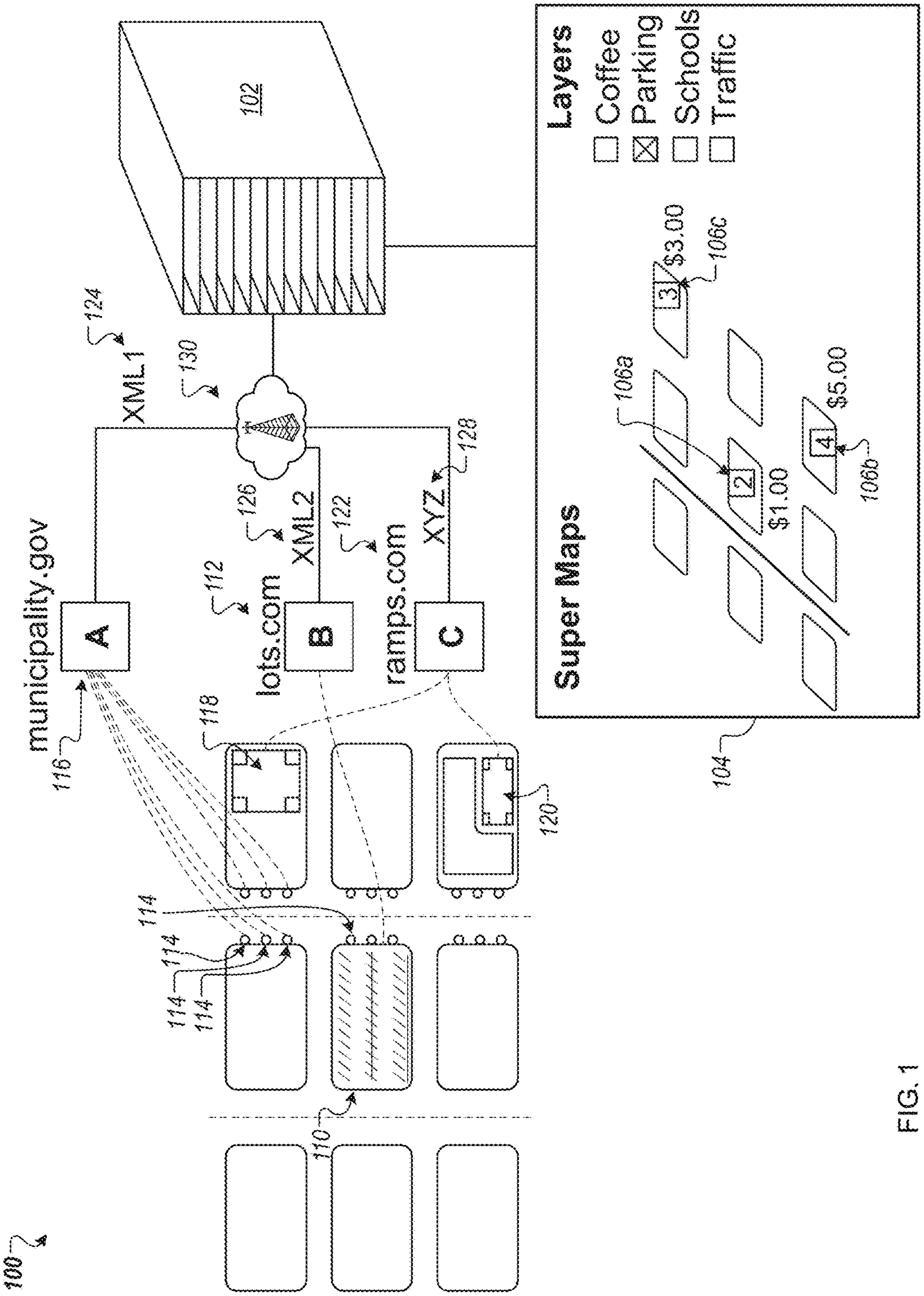
FIG. 1 is a conceptual diagram that shows a system for aggregating parking data across multiple parking providers.

This document describes systems and mechanisms for communicating and managing parking-relating information from different parking providers. The document discusses using particular data structures and formats for the sharing of such information.

Parking information can be shared by parking providers with others, such as aggregation services and/or end-users (e.g., mobile computing devices), using a variety of techniques and/or data formats. For example, real-time parking-related information can be shared as comma-separated values and can be obtained from parking providers using HTTP GET requests. Such comma-separated values can be interpreted using one or more parsing schemes to identify parking spots that are currently available. Receivers of such parking information from parking providers can include end users, such as mobile computing devices that display parking information on maps, and/or middle users, such as a system that aggregates information and makes it available to other middle users or end users.

Real-time parking data can be broken down into various pieces of information, such as information that identifies places to park and information that identifies parking spaces that are currently available. Parking data can be published using various resource feeds, such as a first resource feed that describes a collection of locations (e.g., places that offer parking) and a second resource feed that includes observations of available parking inventory (e.g., parking sports that are currently open). Although parking locations are expected to be more permanent or fixed structures, information provided by such a first resource feed can identify the locations of and/or changes to parking providers. Information provided by such a second resource feed can identify the number (and/or qualities) of parking spaces that are currently available at various parking providers. Available parking inventory may change more often than the locations of parking providers and may be communicated between suppliers and receivers of the information more frequently. In some implementations, a resource feed can be a scoping construct to accommodate different sources of data and frequencies of update from publishers.

A publisher can be an organization that has one or more associated feeds of parking data they wish to provide to consumers. A parking feed can be a source of real-time parking data from one or more publishers. An individual publisher may use multiple parking feeds to segment their data logically (e.g., segment by parking location) and/or by caching behavior. A location can be any place where one or more vehicles may be parked. An inventory report can be a report that identifies a number of parking spaces that are open at a specific location at a point in time. One or more inventory reports can be provided by a publisher within a reporting window (e.g., a period of time). A recent inventory report can be an inventory report that was generated by a publisher within a threshold of the current time (e.g., within the past 30 seconds, past minute, past 5 minutes, past hour, past 24 hours).

An aggregation service can provide real-time parking data based on a information from parking providers, such as information from parking feeds (e.g., information identifying parking inventory), information from location feeds (e.g., information identifying locations that offer public parking), information from inventory reports (e.g., reports that identify quantities of available parking at one or more locations at a point in time), or any combination thereof.

A parking feed can be provided by a publisher and can include information that identifies open parking spaces for one or more of the publisher's parking locations. A parking feed can also include current and/or previous parking reports for one or more of a publisher's parking locations. An individual parking feed can be associated with a unique identifier, such as a "parking feed key" that can be set by a publisher and/or by a parking aggregation service. Values for parking feed keys can selected by a publisher (and/or by a parking aggregation service) so that they are unique with regard to other parking feed keys associated with the same and/or different publishers. A parking feed can include information that identifies one or more associated parking locations and/or one or more associated inventory reports (e.g., include a uniform resource identifier (URI) for a location feed and/or an inventory report feed).

A single publisher can have multiple different parking feeds, the segmentation of which can be based on any of a variety of appropriate factors, such as different sources of parking data, parking locations, updating frequency, and/or caching techniques. Parking feeds may be associated with a name, which may also be a unique identifier, that describes one or more associated parking locations with sufficient detail to permit user discovery of relevant parking feeds.

For example, consider a government agency that is receiving parking information from multiple different sources which are each providing updates at different frequencies (e.g., a first source is providing updates every 10 minutes and a second source is providing updates every minute). Such a government agency would like to make this parking information available to the world but would like to manage feeds from these sources in different manners. The government agency can establish different parking feeds for these different sources, which can allow them to share corresponding parking locations and/or inventory reports. In another example, consider a parking sensor company that chooses to publish separate parking feeds from various cities with which it does business. If the company has several cities as customers, the company can publish this information using separate parking feeds for each city instead of publishing all the data for all cities in a single feed. This separation of parking information into separate parking feeds can allow consumers to narrow the scope of the data they receive to the municipality (or municipalities) that are most relevant to the consumer.

Table 1 below provides an example of information that can be provided as part of a parking feed, including example properties and example data types:

TABLE 1

| Property | Type | Description | Sample Value |
|---|---|---|---|
| FeedKey | string | String to identify a parking feed. Value can be distinct from other parking feed keys used by the same publisher | Metersonmainstreet "busesonfirstavenue" |
| LocationsURI | URI | Endpoint for Locations feed | http://.../feedname/locations" |
| InventoryURI | URI | Endpoint for Locations feed | http://.../feednameinventory" |
| UpdateExpectation | int | The expected period of time (e.g., number of seconds, minutes) between feed updates. This value can provide an expectation for consumers of how often the feed will updated. This number may not binding and can instead be informational. No value or a zero value may indicate no initial expectation for update frequency. An HTTP header "expires" may govern polling expectation. | 90 120 |

The information provided in a parking feed may be represented in any of a variety of appropriate manners. For example, a parking feed can be published as comma separated values, such as the following:

FeedName, LocationsURl, InventoryURI, UpdateExpectation

For instance, the following is a set of example values that can be provided for a parking feed:

metersonmainstreet, "http:// . . . /parking/metersonmainstreet/locations", "http:// . . . /parking/metersonmainstreet/inventory", 90

In this example, the values can indicate that (a) there is a parking feed called 'metersonmainstreet'; (b) the locations information for the parking feed can be found at http:// . . . /parking/metersonmainstreet/locations; (c) the Inventory information for the parking feed can be found at http:// . . . /parking/metersonmainstreet/inventory; and (d) updates are provided every 90 seconds In another example, the following may be a second set of example values that can be provided for a parking feed:

cityofatlantis, "http:// . . . /parking?city=atlantis&data=location", "http:// . . . /parking? city=atlantis&data=inventory", 120

In this example, the values can indicate that (a) there is a parking feed called 'cityofatlantis'; (b) the locations information for the parking feed can be found at http:// . . . /parking?city=atlantis&data=location; (c) the inventory information for the parking feed can be found at http:// . . . /parking?city=atlantis&data=inventory; and (d) updates are provided every 120 seconds.

A location can be a representation of a place where vehicles can be parked, such as a garage, a block face, and/or an exterior lot. Vehicles can be presumed to have a context appropriate standard size. Information regarding locations, such as a corresponding name (e.g., "ABC Parking Garage"), geographic identifier (e.g., GPS coordinates, street address), and associated fees (e.g., $2/hour, free), can be provided in location feeds which can be identified location information in parking feeds (e.g., location URI). Current inventory for locations (e.g., available parking spaces) can be provided by corresponding inventory reports.

Table 2 (shown in FIG. 8) describes an example set of properties that can be provided as part of a location feed. In this example, a location is identified by a key that is unique within the scope of a corresponding parking feed that reports information for the location. Information from a location feed may not be updated as frequently as a parking feed and may be cached by clients of the published data.

Location information can be published in a variety of formats, such as comma separated values. For example, location information can be published as the following:

Key, Name, LocationPoint, Geometry, ParkingType, CostType

For instance, the following is an example of such location information that can be provided:

"123MAINST", "Garage at Madison Park", "4073710, −7399607", "40737131, 73996171; 40737259, −73996023; 40737137, −73995640; 40736929, −73995768", onstreet, free In this example, the location information indicates that there is a (a) location identified by the key "123MAINST"; (B) it is called "Garage at Madison Park"; (c) it has the center point located at 4073710, −7399607; (d) it is drawn on a map as a segment described by 40737131, −73996171; 40737259, −73996023; 40737137, −73995640; 40736929, −73995768; and (e) it is free on street parking.

Inventory reports can provide information regarding available inventory at various parking locations, which can be referenced using a key for a corresponding parking location. Inventory reports can include a variety of appropriate details to provide parking location-specific inventory information, such as key for a corresponding parking location, a time of observation (e.g., how recently open parking spots were identified), a quantity of parking available (e.g., 10 parking spots open) and/or occupied at the time of observation (e.g., 50 parking spots filled). In such reports, a presumption can be made that a capacity of a parking location at the time of a report is equal to a sum of the available parking spots and the occupied parking spots. Such a capacity can indicate a number of parking spots that are provided for public parking—a parking location may have reserved parking spots that are not part of the capacity. Additionally, the capacity of a parking location may change over time. For instance, particular parking spots may be reserved within a parking garage for particular hours (e.g., 8:00 am-5:00 pm on weekdays) and may become available to the public outside of those hours—meaning the capacity of the parking garage may increase or decrease depending on the time of day.

Table 3 below provides example properties for information that can be provided as part of an inventory report:

TABLE 3

| Property | Type | Description | Example Value |
|---|---|---|---|
| LocationKey | string | Identifies a key for a corresponding location. | "123MAINST" "BEACHGARAGEA" "MUNICIPALLOT289" |
| ObservationTime | datetime | Time at which inventory | 2011-04-14T20:46:32Z |

TABLE 3-continued

| Property | Type | Description | Example Value |
|---|---|---|---|
| | | observation was taken. Observation can be provided by one or more sensors and/or by people. This time may be different than the time the observation is made available as an inventory report - possible to have latency from when the observation was made to the time it is reported. Can have any of a variety of appropriate formats (e.g., UTC timestamp; time, date, and timezone identifier) | |
| Available | integer | Number of available single vehicle parking spots | 12<br>0<br>230 |
| Occupied | integer | Number of single vehicle parking spots that are currently occupied. | 22<br>0 |

An inventory report can be represented in any of a variety of appropriate data formats, such as comma-separated values. For example, the following format can be used to provide inventory reports: LocationKey, ObservationTime, Available, Occupied. For instance, the following is an example inventor report that can be provided using such a format: “123MAINST”, 2011 Apr. 14 20:46:32, 12, 22. In this example inventor report, the included information identifies that (a) the inventory report is for a corresponding location with the LocationKey “123MAINST”; (b) the observations included in the report were observed at Apr. 14, 2011 20:46 UTCI; (c) there were 12 available parking spots at the time of the observation; and (d) there were 22 occupied parking spots at the time of the observation. A client interpreting this report may conclude that the Location with the key “123MAINST” had a capacity of 34 parking spots at the time of the observations used to generate the inventory report.

FIG. 1 is a conceptual diagram that shows an example system 100 for aggregating parking data across multiple parking providers. The diagram in particular shows a representation of a 3×3-block area in an urban area. In the center block is an open parking lot 110 (shown by lined parking spots) that is managed by a company that operates the Internet domain www.lots.com. That company may have a central server system, represented by block B 112, that regularly receives data from a terminal at the lot 110, such as in a booth of an operator in the lot 110, so as to indicate when cars enter or exit the lot 110, and thus to permit the computation of the availability of open spots in the lot 110.

Street spots 114 on one street are shown to represent meters along the street and are operated by a local city that operates the municipality.gov domain (represented by block A 116), and two ramps 118 and 120 in the Northeast and Southeast corners of the grid, respectively, are operated by a company that owns the ramps.com domain, and is represented by block C 122. Each of the blocked computer systems may have published APIs by which they transmit real-time parking inventory data, such as different XML schemes (XML1 (124) and XML2 (126)), comma separated data values, and/or other proprietary schemes (e.g., XYZ (128)), through a network 130 such as the internet. Such publishing may be made to third parties who wish to see data about parking availability, such as a parking aggregation service and/or end users.

A server system 102 can provide a parking aggregation service that aggregates parking information from the parking providers 112, 116, and 122, and provides a single source of parking information for the parking locations 110, 114, 118, and 120 to end users (e.g., client computing devices). The server system 102 may subscribe to data feeds form one or more of the three parking providers 112, 116, and 122 (a push mode), and/or may make periodic requests for real time parking inventory to the providers 112, 116, and 122 (a pull mode). The server system 102 may then convert all of the information into a common format, such as that described above, and may make it available to other third parties, such as end users and/or other parking aggregation services. For example, users of mobile devices may make requests of the server system 102, which may return data for generating a UI of a map 104, with parking and related data overlaid as annotations on the map. One layer of the map data may be parking data, which may be provided by the server system 102. As shown on the UI 104, a map of the grid is overlaid with boxes 106*a-c* having numbers inside, at each of the locations of a parking ramp or lot (the parking locations 110, 114, 118, and 120), where the numbers represent the number of available spots at a facility at the latest reporting, and a price or series of prices to indicate the cost of a particular facility. Optionally, an indicator could show how long it has been seen an up-to-date report has been received for a facility—such as by coloring the inventor number green, yellow, or red based on whether the last report came in a short time ago or a long time ago.

Figure 2B:
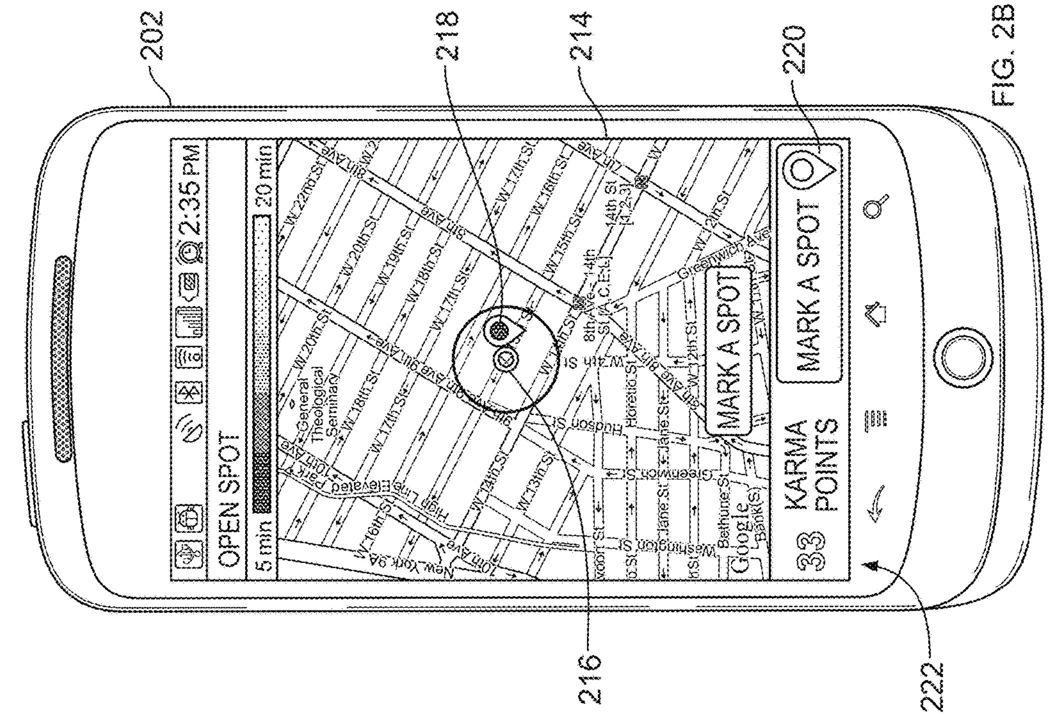
FIGS. 2A and 2B show example user interfaces for displaying parking data.
Figure 2A:
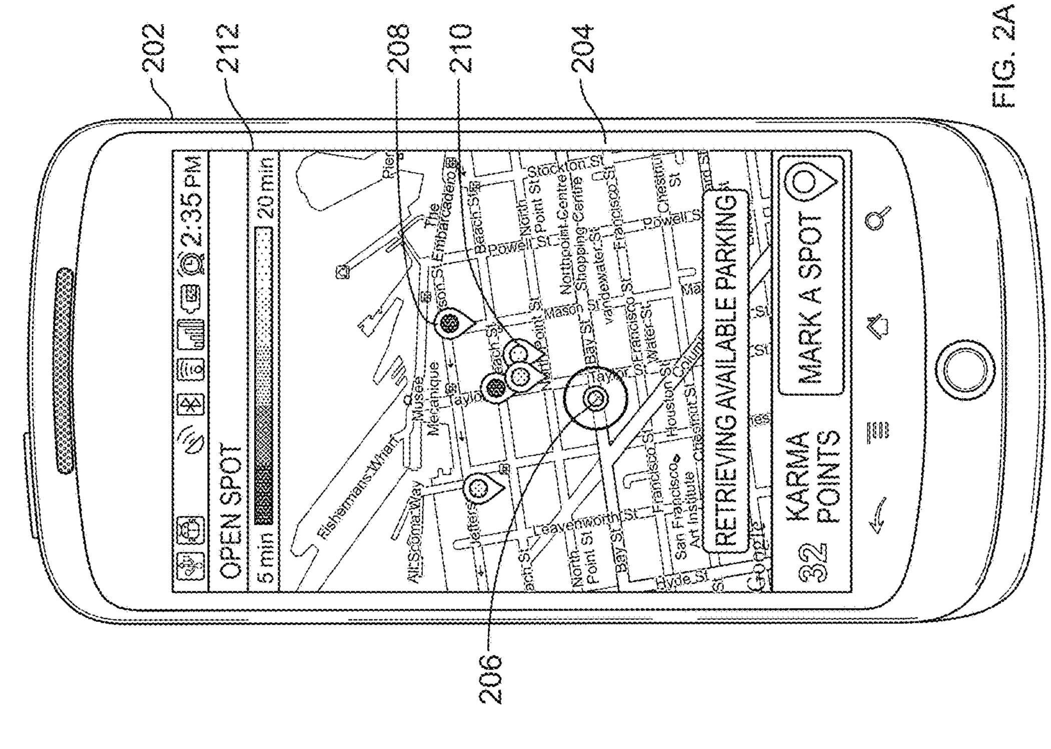

FIGS. 2A and 2B show example screenshots of a parking tracking application running on a mobile computing device 202. In FIG. 2A, a graphical user interface 204 is displaying an enhanced road map that is associated with the parking tracking application. The parking information may be implemented, for example, as a particular visual layer of a more general mapping application—and when the layer is turned on, icons for parking spots or facilities will be displayed along with other graphical elements, and user-selectable controls for interacting with the parking tracking application. In this example, the parking tracking application is operating in a mode that allows a user to identify open parking spaces either individually or in particular facilities in a particular area (e.g., within a certain distance of the user, within a certain area of a city, or within a certain distance from a landmark). For example, the enhanced roadmap shows a user indicator 206 that represents a current position of the mobile computing device 202 (e.g., using GPS technology, as described in greater detail below), and also displays five open parking spots or facilities, including parking spots or facilities 208 and 210. As demonstrated by the legend 212, parking spot 208 has been open for a short amount of time (e.g., five minutes or less), while parking spot 210 has been open for a relatively long time (e.g., twenty minutes or more).

Where an icon represents a facility that has multiple spots, the icon can be supplemented with a number or other indication that indicates the number of spots that are available in the inventory of the facility at the present time—or at least since the last report. In such an example, the legend 212 may indicate the time since a facility last provided a report on its inventory, and a color of an icon for the facility may appear in a color that indicates how stale its data is.

The states of the indicators that represent the parking spots or facilities can change according to the scale represented by the legend 212, and can be removed entirely after a predetermined amount of time has elapsed, or if a facility has no open spaces. For example, the parking spot 210 can be removed from a list of open parking spots after being marked as open for two hours. This policy may reflect the low-likelihood that a parking space would remain open for more than two hours. The predetermined amount of time can vary based on locale; for example, a parking spot may be removed after only thirty minutes in a busy part of a large city, but may remain open for two hours in a more rural area. Similarly, while the legend 212 may represent a range of five minutes to twenty minutes in the example of FIG. 2A, this range (and its increments) can be altered based on location information, user preferences, and other factors.

The speed with which an open spot decays and is eliminated can be based on learned historical activity for an area around the spot. For example, where one user who has a device that is active with the system leaves a spot, and another active device enters the spot a short time later, an inference may be made that the spot stayed open for at least that amount of time. The amount of time (when aggregated with many other such vacate-refill episodes for spots n the same area and across a large area) may then be correlated with the time of day and the day of the week to identify refill speed for an area around the spot. The refill speed may also be compared with refill speeds for various other locations in order to estimate adjustments that need to be made from the data derived from users of device-equipped and enrolled cars, to better reflect the activity of all users and a real average refill speed. For example, it may be determined that refill speeds for device users generally underreport the real-life refill speed by 20%, so that a system may increase its computed refill speed by a corresponding percentage in order to better report on the likelihood that a space will still be open.

Activation of an indicator that represents an open parking space or facility can cause the mobile computing device to provide details about the parking space or facility. In some examples, the parking space or facility details includes pricing information (e.g., if the parking space requires a fee), time limit information (e.g., if the parking space or facility has a limit on the amount of time that a driver may park in the parking space or facility), and/or ownership information (e.g., whether the parking space or facility is a public space, or a private space or facility requiring a parking pass, decal, or permit). Users can also filter the parking spots or facilities that are displayed on the enhanced road map using the parking details, or other information such as safety (e.g., parking spots that are located in low crime areas or near police stations), proximity to a landmark (e.g., parking spots that are located near a venue that the user plans to attend after parking his vehicle) and/or cost (e.g., facilities may be assigned a cost level from 1 to 5).

Activation of an indicator that represents a parking spot or facility may also initiate a navigation program that provides turn-by-turn directions to the parking spot. For example, after the mobile computing device 202 (or a server in communication with the mobile computing device 202) has identified a location for a parking spot associated with the activated indicator, (i.e. a destination for the navigation), it may generate a route between the current location 206 of the mobile computing device and the destination. The route can then be provided to a user who is using a combination of graphical cues (e.g., maps) and audio cues (e.g., a voice instruction to "turn right in two miles").

FIG. 2B shows an exemplary graphical user interface 214 that depicts a current position 216 of the mobile computing device 202 as well as a parking spot 218 that the mobile computing device 202 has recently "marked." FIG. 2B represents an exemplary manner in which the mobile computing device 202 (sometimes in combination with a parking tracking application) may be used to gather information that identifies open parking spots. The mobile computing device 202 can use a variety of techniques to mark open parking spots. For example, if a user of the mobile computing device sees an open parking spot while walking, driving, or otherwise, the user may activate a mark control 220 within the parking tracking application to provide a location of the open parking spot to a parking server (e.g., a remote entity that interacts with a plurality of mobile computing devices to collect, maintain, and provide information that can be used to administer a parking tracking application). For example, if the mobile computing device 202 is located near the open parking spot, providing a location of the open parking spot can include sending a GPS coordinate of the mobile computing device 202 to the parking server when the user selects the mark control 220.

Other techniques can also be used to mark open parking spots. In some examples, reports can be automatically triggered by movement of the mobile computing device 202. For example, the mobile computing device 202 may contain an accelerometer (e.g., accelerometer unit 434 (FIG. 4)) that measures an amount of vibration or movement of the mobile computing device 202. The mobile computing device 202 can use these measurements to automatically trigger the generation of a report that includes the location of an open parking spot. In some examples, the mobile computing device 202 could register an "intent" (i.e., a programming facility to allow one application to bind itself to another application so as to be informed when certain event occur) with its operating system or another application to cause the generation of a notification when a vibration of the mobile computing device 202 exceeds a threshold value, or matches a predefined vibration profile. This notification could represent that a user has begun to travel in a vehicle, causing a particular mode of vibration. By triggering a notification at a time when a user is potentially beginning to travel in a vehicle, the notification can represent that a user (along with his mobile computing device 202) has entered a vehicle in a parking spot and then subsequently left that parking spot, leaving it open. Thus, an "open spot" report can be generated based on the notification that results from the intent registered with the operating system, and the open spot can be registered and marked on the parking server.

In some examples, the velocity of the mobile computing device 202 can be used in order to automatically generate notifications and open parking spot reports. For example, the mobile computing device 202 can determine its velocity using a plurality of GPS readings. An intent registered with the operating system of the mobile computing device 202 can cause a notification to be generated when the velocity of the mobile computing device 202 exceeds a threshold value (or that the velocity has changed by a threshold value). The mobile computing device 202 can use the velocity measurements to determine whether a user has entered a vehicle at a velocity near zero (e.g., while the vehicle is parked) and has subsequently begun to drive away from a parking spot. Again, by triggering a notification at a time when a user is potentially beginning to travel in a vehicle, the notification can represent that a user (along with his mobile computing device 202) has entered a vehicle in a parking spot and then subsequently left that parking spot, leaving it open. Thus, an "open spot" report can be generated based on the notification that results from the intent registered with the operating system, and the open spot can be registered and marked on the parking server.

Other factors can affect whether a notification and/or an open parking spot report are automatically generated. For example, the mobile computing device 202 can be configured to require that the threshold vibration frequency or the threshold velocity continue for a threshold length of time (e.g., ten seconds). The location of the mobile computing device 202 can also be cross-referenced with locations of known parking spots (and with locations that are devoid of parking spots, such as highways) in order to prevent the accidental marking of an open parking spot when, for example, a user begins driving after being stopped in a traffic jam on a highway. Also, in some examples, a notification can cause a generation of an opportunity to confirm or prevent the generation of an open parking spot report. For example, if a velocity notification is generated after a user has entered a parked vehicle and driven away from the parking spot at a threshold velocity, the notification may result in a challenge being presented on a graphical user interface of the mobile computing device 202. The challenge may ask the user whether an open parking spot report should be submitted to the parking server. If the user responds in the affirmative (e.g., by activating a "confirm" option associated with the challenge), the report can be generated and/or submitted to the parking server. If the user responds in the negative (e.g., by activating a "cancel" option associated with the challenge) a generation and/or submission of the report can be prevented.

After a user has marked an open parking space, an account associated with the user and/or the mobile computing device 202 can be rewarded. For example, the parking server may award a parking spot tracking account associated with the mobile computing device 202 one or more "karma points" 222. In some examples, karma points 222 are a numerical representation of the number of times that a user has marked open parking spots using the parking spot tracking application. If a user accumulates a threshold level of karma points, other rewards can be provided to the user. For example, if a user accumulates fifty karma points, a user can be provided with access to enhanced features within the parking spot tracking application (e.g., a user can be allowed to view more open parking spots than users with fewer karma points), or can be provided with titles/honorifics, electronic trophies, electronic badges, or other items that represent a user's satisfaction of a karma point milestone.

Figure 3:
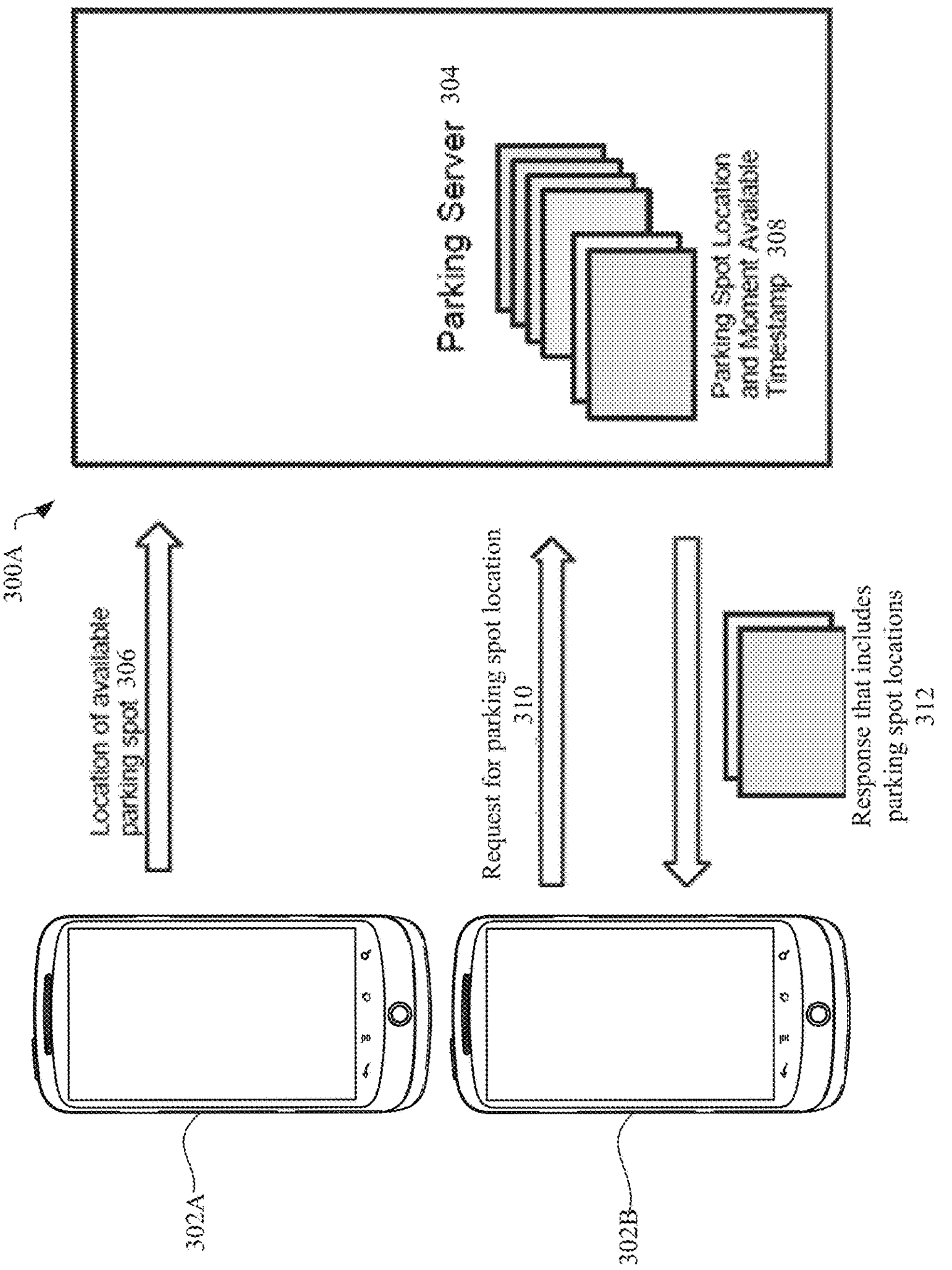
FIG. 3 shows an example flow of information between mobile computing devices and a server.

FIG. 3 is a block diagram of a workflow within an example system 300 for marking, requesting, and receiving the locations of one or more open parking spots. Largely, this description relates to individual parking spots that may have been indicated as being open when a user of a mobile device marked them as being open, but spaces may also be indicated as being open when an organization managing a parking facility indicates that it has an inventory of open spots. The system 300 includes two mobile computing devices 302A and 302B which, in this example, are smartphones. As discussed above, mobile computing devices can mark open parking spots and can request and receive the locations of open parking spots (e.g., parking spots that have been marked as open by another mobile computing device). The system 300 also includes a parking server 304 for communicating with the mobile computing devices 302A and 302B and for storing, organizing, and serving content associated with the tracking of parking spots.

The parking server 304 receives a message that includes the location of an available parking spot from the mobile computing device 302A (306). The message containing the location of the available parking spot can include any of a variety of appropriate information to identify the parking spot, such as a GPS location of the parking spot, a name of a parking location (e.g., parking garage) where the spot is located, an address for the parking location, a size of the parking spot (e.g., a "compact car" parking spot), and/or a timestamp that identifies when the parking spot was marked (e.g., marked using one or more of the techniques described above). The parking server 304 adds the identified parking spot to a database of parking spots along with the received time stamp that identifies the moment the parking spot was marked (308). The parking server 304 may further organize the received parking spot locations according to their GPS locations, city, state, size, and/or other metric. The parking server 304 (or the parking tracking application) may also identify additional information about the marked parking spot, such as whether the marked parking spot is a public spot, a private spot, or whether a permit, sticker, or pass is required to utilize the parking spot.

Additionally (or alternatively), the parking server 304 can obtain the parking spot information 308 from one or more parking providers, as described above. For instance, inventory reports for parking locations can be provided to the parking server 304 by one or more parking providers, such as the parking providers 112, 116, and 122 described above with regard to FIG. 1. Such parking providers can provide parking inventory information to the parking server 304 in any of a variety of formats, such as using the parking feed, location feed, and inventory reporting techniques and data structures discussed above. The parking server 304 can obtain parking information from parking providers using push and/or pull techniques. The parking server 304 can aggregate parking information from parking providers and individual end users, such as the mobile computing device 302A.

The parking server 304 receives a request for a parking spot location from a mobile computing device 302B (310). The request may include the location of the mobile computing device 302B (e.g., as a GPS coordinate), and may also include one or more other preferences selected by a user of the mobile computing device 302B, such as a desired parking spot price range, a desired parking spot size, and a desired park time limit. These preferences may also be stored in an account associated with the mobile computing device 302B on the parking server 304 or on another computing entity.

The parking server 304 uses information received in the request and/or information associated with an account of the mobile computing device 302B (e.g., user preferences) in order to identify parking spots that match the criteria. If the parking server 304 identifies one or more suitable parking spaces, the parking server transmits a response that includes a list of available parking spaces to the mobile computing device 302B (312). The response may include further information about some or all of the parking spaces, such as prices, parking spot sizes, and parking spot time limits. The available parking spaces can then be displayed on a graphical user interface associated with the mobile computing device 302B (e.g., in the manner shown in FIG. 2A).

Figure 4:
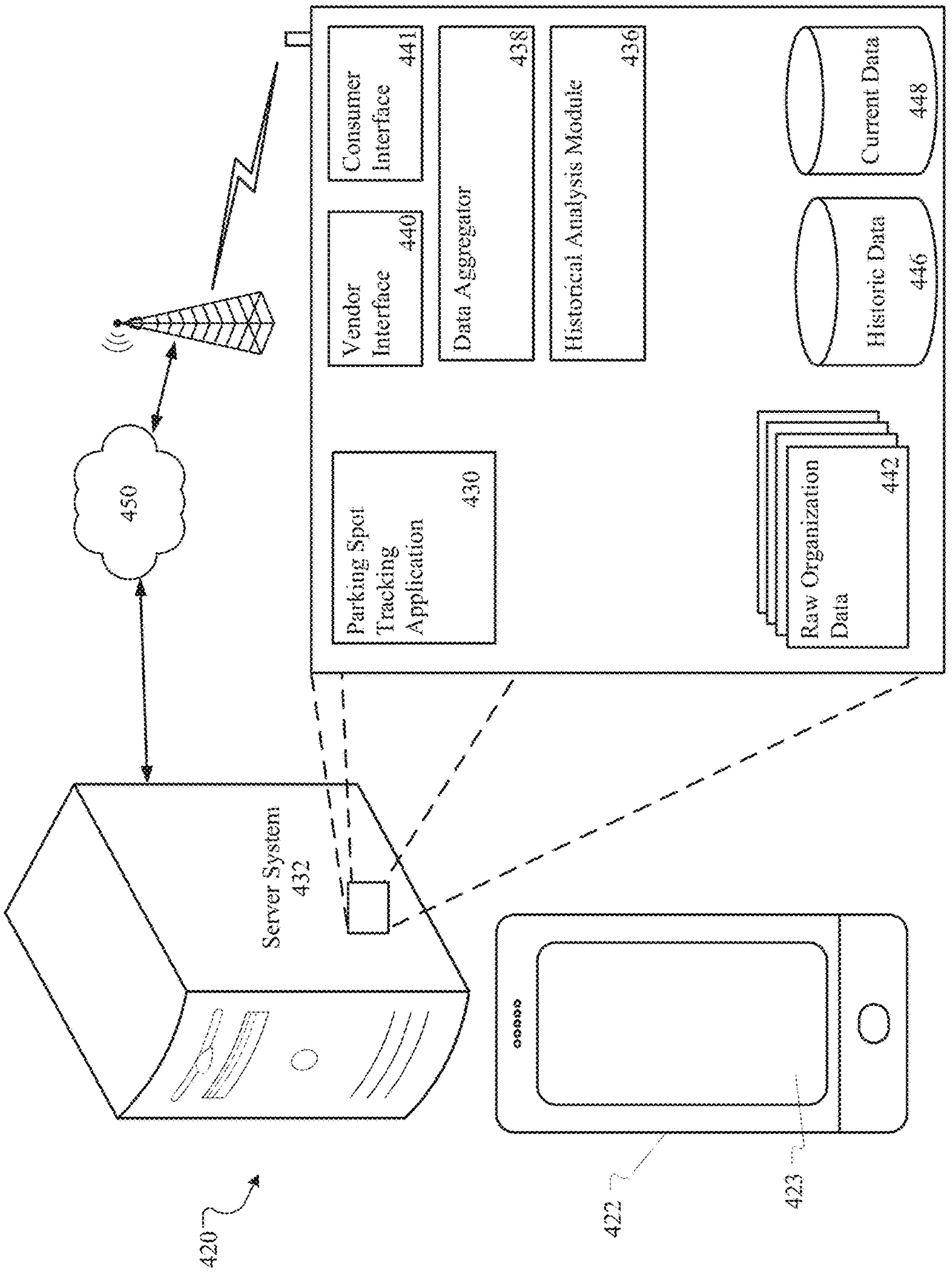
FIG. 4 is a schematic diagram of a system for providing information to a user of a mobile device.

FIG. 4 is a block diagram of an example mobile device 422 and an example system 420 for providing navigation information to a user of the device 422, where the navigation is directed toward parking facilities that have open inventory. In general, the system 420 includes software operating on the device 422 in cooperation with software at a server system 432 executing a hosted version of a navigation application. In such an example, the device 422 may interact with a user, and may transmit information for various pieces of the processing to be performed on the server system 432, such as speech-to-text conversion, converting search queries into geographic locations such as in a lat/long format, and serving map tile or images in coordination with data that may permit a navigation application executing on the device 422 to interact with a user in the manners described above and below.

In the example shown, the mobile device 422 is a smartphone. In other implementations, the mobile device 422 can be an in-dash vehicle navigation device (which may provide navigation functions and additional computing functions, including auto stereo control, maintenance warnings and the like), a personal digital assistant, a laptop computer, a net book, a camera, a wrist watch, or another type of mobile electronic device. The mobile device 422 includes a camera and a display screen 423 for displaying text, images, and graphics to a user, including images captured by the camera. In some implementations, the display screen 423 is a touch screen for receiving user input. For example, a user contacts the display screen 423 using a finger or stylus in order to select items displayed by the display screen 423, enter text, or control functions of the mobile device 422. The mobile device 422 further includes one or more input devices such as a track ball 424 for receiving user input. For example, the track ball 424 can be used to make selections, return to a home screen, to scroll through multiple items in a group, or to control functions of the mobile device 422. As another example, the one or more input devices include a click wheel for scrolling through menus and text.

The server system 432 includes a number of modules for receiving, formatting, and aggregating information about parking spot inventory that is received from a number of parking providers (e.g., parking providers 112, 116, and 122 discussed above with regard to FIG. 1), such as operators of flat lots and parking ramps. A parking spot tracking application 430 tracks available parking spots at one or more parking locations based on parking information obtained from parking providers and/or end users, as described above. A vendor interface 440 operates to obtain such information for the providers, while a consumer interface 441 operates to provide the aggregated and commonly formatted information to third-party requesters of the data. A data aggregator 438 reformats data received from providers, such as by filtering it through a template that defines transformations between a known format for the particular provider, and a common format of the system 420. A historical analysis module 436 queries common format data from data stores 446, 448 to make inferences about parking availability and other factors. For example, the module 436 can find trends in parking availability and product availability in the future following those trends. The historic data store 446 may store data from past times, which may be used for analysis by module 436. A current data store 448 may store data about real-time conditions in various facilities, and may include a greater number of data fields than does the historic data, which may involve less frequent updates, and less information about those updates. Also, the unformatted data form the various providers may also be saved for future analysis as raw organization data 442.

The server system 432 can communicate with parking providers, end users (e.g., the mobile computing device 422), and other computing devices over one or more communication networks 450. The communication network 450 can be a combination of one or more types of communication networks, such as a local area network (LAN), a wide area network (WAN), a virtual private network (VPN), a wireless network, a fiber optic network, a cellular network, a 3G/4G network, and/or the internet.

Figure 5A:
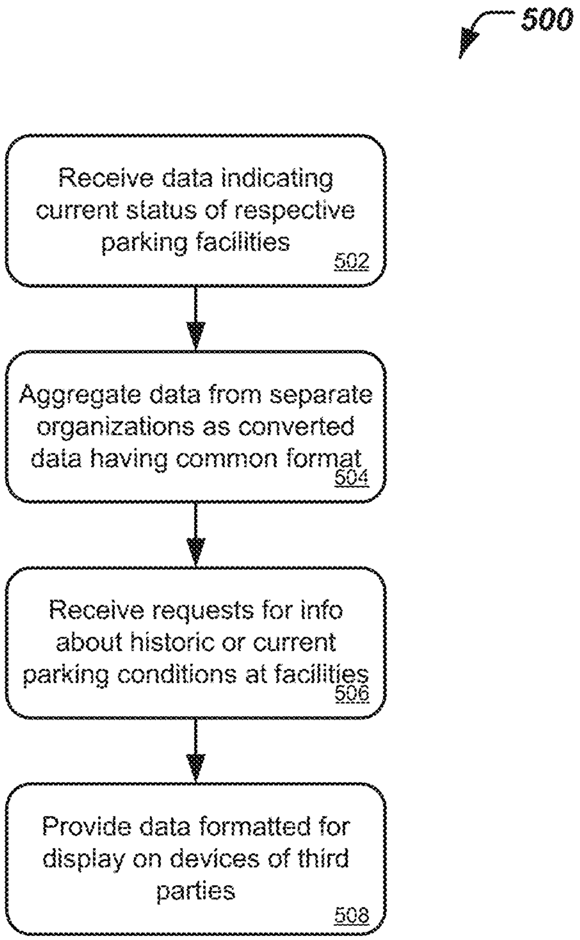
FIG. 5A is a flow chart of a process for managing parking spot data from multiple parking provider organizations.

FIG. 5A shows an exemplary process 500 for tracking parking spot availability form multiple providers. In some examples, the process 500 can be carried out on a remote server (e.g., the computer system 102, the parking server 304, the server system 432) in communication with one or more mobile computing devices (e.g., mobile computing device 202, mobile computing devices 302A-B, mobile computing device 422) and/or provider-based systems (e.g., parking providers 112, 116, and 122).

At box 502, the process involves receiving data that indicates a current status of respective parking facilities. Such information may be received at a server system of an aggregation service, and may be formatted and controlled as discussed above. For example, parking information can be obtained using a parking feed, a location feed, and inventory reports from one or more parking providers, as discussed above. Parking information can be obtained using push and/or pull techniques. Parking information can also (or alternatively) be obtained from end users who are marking open and/or occupied parking spaces at various parking locations.

At box 504, the system aggregates the data form the separate organizations form which the data has been obtained, and converts the data, as necessary, into a common format. Some of the organizations may provide their data in the common format so that no conversion is needed for their data. For example, data can be provided by parking providers and/or end users in any of a variety of appropriate formats, such as XML, comma separated data, and/or unformatted information.

At box 506, the process receives requests for information about historic or current parking conditions at the facilities of the reporting organizations. For example, researchers may request groups of historical information, or users of mobile navigation and mapping devices (including appropriately programmed smartphones), may make such requests to see maps that are overlaid with indications of open spots and related information (e.g., the parking rates). Such requests may include information indicating geographic location or area that is of interest to the user, such as a current geographic location of the user and/or a geographic area to which the user is travelling.

At box 508, the system provides aggregated parking spot information that is formatted for display on a screen of a requesting device, such as in the form of map-based data. The parking spot information can be provided to a client computing device, such as the mobile computing device 202, and can include a variety of information regarding available parking spots, such as location, time since the spot was last reported open, a number of open spots at a particular location, and/or price information. At least a portion of this information may be presented on a client computing device in a user interface, such as layer in a map overlay.

Figure 5B:
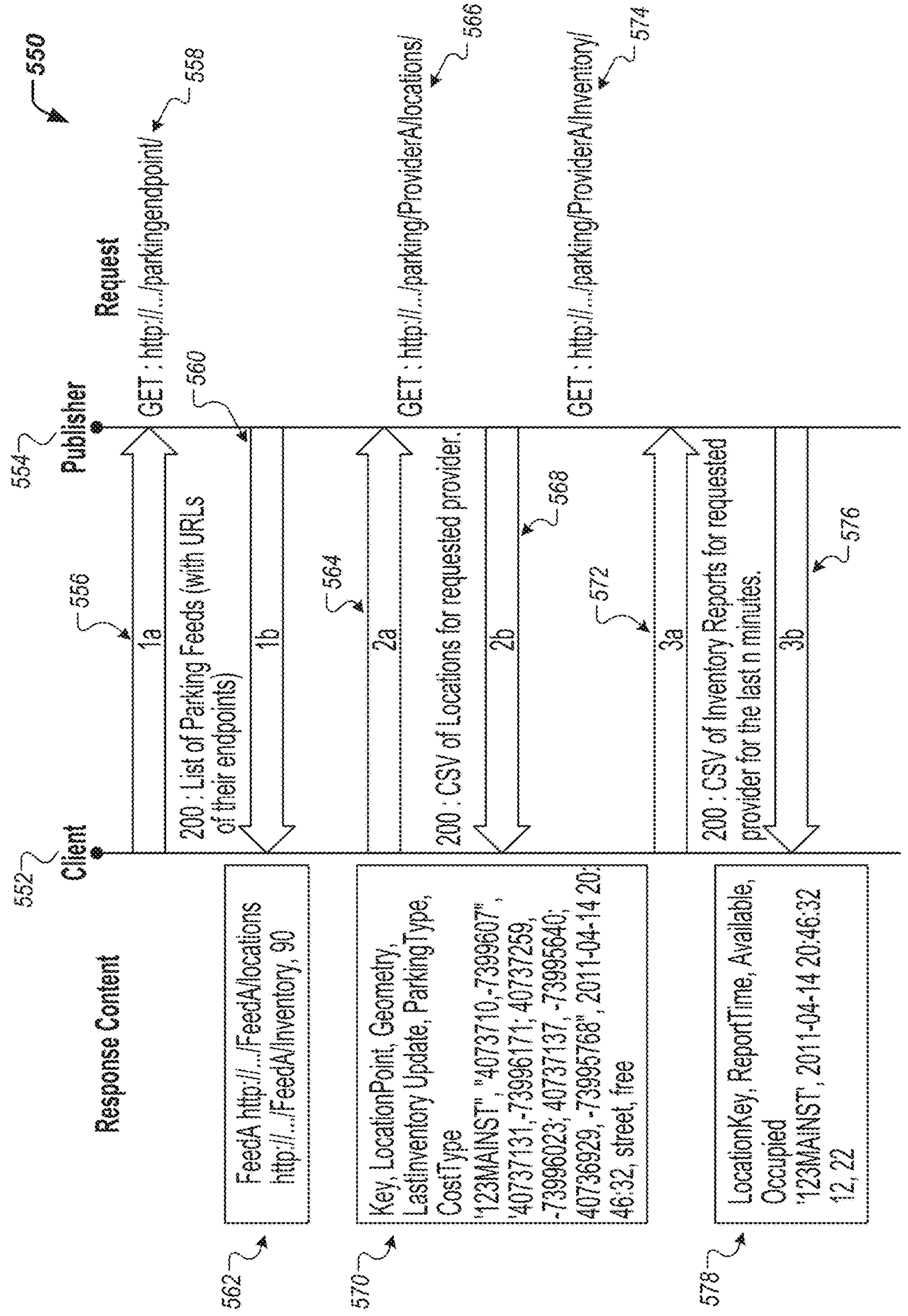
FIG. 5B is an activity diagram of a process for managing parking spot data.

FIG. 5B shows an exemplary process 550 for obtaining parking information from one or more parking providers. The process 550 is depicted as being performed by in-part a client 552 and in-part by a publisher 554. The client 552 can be any of a variety of appropriate computing devices, such as a computer system that provides a parking aggregation service (e.g., the computer system 102, the parking server 304, the server system 432) and/or an end user device (e.g., the mobile computing device 202, the mobile computing devices 302A-B, the mobile computing device 422). The publisher 554 can be any of a variety of appropriate computing devices, such as computing devices associated with parking facility operators, such as the parking providers 112, 116, and 122.

As indicated by arrow 556, a GET request 558 is provided by the client 552 to the publisher 554 as part of a parking feed discovery process. The request 558 can include a URI for one or more of the parking feeds that are provided by the publisher 554. In response to receiving the request 558, the publisher 554 can provide a list of parking feeds to the client 552 (arrow 560). The list of parking feeds can include a variety of information, such as information that identifies corresponding location feeds and inventory reports, and information that identifies a frequency with which this information is updated. Example information for parking feed A is provided in box 562.

As indicated by arrow 564, a second GET request 566 for information from one or more location feeds (identified from the parking feed) is provided by the client 552 to the publisher 554. The request 566 can include a URI for a particular parking location feed for which that the client 552 is interested in obtaining data. In response, the publisher 554 can provide location information for one or more location feeds to the client 552, as indicated by arrow 568. An example set of parameters provided for a location feed are listed in box 570 along with example values for each of the parameters. As discussed above, the location feed can include information that identifies a geographic location of a parking provider, describes the type of parking offered (e.g., free, paid, rates), and/or a key that uniquely identifies the parking location for use in obtaining relevant inventory reports.

As indicated by arrow 572, the client 552 can provide a third GET request 574 for an inventory report to the publisher 554. The request 574 can include information that identifies the particular parking location for which the inventory report is sought, such as a URI and/or a key for the parking location. In response, the publisher 554 can provide one or more inventory reports to the client 552, as indicated by arrow 576. The inventory reports can include a variety of information, such as information that identifies a current inventory of available parking spots, occupied parking spots, and/or a timestamp associated with an observation that resulted in the inventory report. An example set of parameters for an inventory report are provided in box 578 along with example values for each parameter. One or more inventory reports can be provided by the publisher 554, such as every inventory report for the parking location that was generated within a threshold period of the current time (e.g., inventory reports for the past minute, two minutes, ten minutes).

The process 550 shown in FIG. 5B may be repeated by a parking aggregation service, such as the client 552, for a plurality of different publishers. Additionally, the requests 558, 566, and 574 that are indicated by arrows 556, 564, and 572, respectively, may be repeated multiple times without also repeating other requests. For example, after providing the requests 556 and 564, the request 574 may be repeatedly provided without repeating requests 556 and 564. Such polling of the publisher 554 by the client 552 for current parking inventory information can result given the real-time nature of the parking inventory data. By separating location data from inventory information, one can minimize the need for re-transmission of data that is not likely to change, like parking location information. Accordingly, the client 552 can be responsible for caching information that is unlikely to change frequently, like location information and parking feed information. Expiration information that defines a period of time that defines a period of time after which information should be refreshed (e.g., requested again), such as an expiration header, can be included in the information 562, 570, and 578 that is provided to the client 552. After expiration of such a period of time, the client 552 can repeat one or more of the requests to the publisher for parking feed information, location feed information, and/or inventory reports. In some implementations, the publisher 554 can cache responses to these requests, such as the location response (e.g., information contained in box 570), for at least a threshold period of time or until updated response is generated. This cached information can be provided by the publisher 554 in response to requests from the client 552 to save the publisher 554 time if the response is unchanged.

Polling frequency can also be controlled in various manners. For example, the publisher 554 can use appropriate HTTP headers and response codes to offer instructions to, and set expectation of, the requesting client 552. As one example of a header, a "modified date" for real time inventory reports can be communicated that identifies the last time that a recent reports data set was modified. Using the modified date of the data set can allow inventory reports that may have a higher latency to be communicated even though they are not the most recent in the data set.

As another example, expiration can be used to communicate to the requesting client when to poll for various information, such as location feed information and/or inventory reports. Feeds that receive less frequent updates can set the expectation of when the next update will occur. It can be up to the publisher 554 regarding how to handle cases where updates to the current inventory data have been made after an inventory report was provided to the client 552. In some implementations, the publisher 554 can set the expiration to be optimistically fast based on a heuristic applied to recent updates rather than risk cooling an update until the clients provides a subsequent request for an updated inventory report.

For example, suppose a garage closes for the night at midnight in New York EDT (05:00 UTC/GMT) and re-opens the next morning at 07:00 EDT (12:00 UTC/GMT). An expiration header for an inventory report that is provided by the publisher 554 for the garage when the garage is closed can be set to reflect 12:00 UTC as the time when the inventory report expires. Accordingly, the client 552 can be instructed by this expiration header to stop polling the publisher 554 for updates to the garage's inventory until after the expiration has elapsed at which point the client 552 can resume polling.

An example of such HTTP header information is shown in Table 4 (shown in FIG. 9).

The publisher 554 can also provide for response codes. One such code is a "not modified" code (e.g., 304 code), which can indicate that not modifications to the requested information have been made since the previous request. Such a code can be provided to the client 552 to in response to a request form the client 552 that includes a timestamp associated with the previous information obtained by the client 552 (e.g., an "If-Modified-Since" header value), which can reduce processing and bandwidth use. Another code that can be used is a "no content" code (e.g., a 204 code). After a reporting window has elapsed, any requests that arrive for inventory resources without an "If-Modified- Since" header can be returned a no content code with an expiration header value to reflect the next time an updated inventory report is expected.

The publisher 554 can set a backward-looking time window to control how far into the past the publisher 554 will continue to send recent inventory reports. For example, the publisher 554 could have a reporting window of 20 minutes. In such a situation, inventory reports older than 20 minutes would stop being returned to the client 552. The publisher 554 can be responsible for determining how long its reporting window will be and this value may change over time depending on a variety of factors, such as request volume from clients, the frequency with which inventory reports are updated or generated, and/or available network resources. The client 552 can also adjust its display and polling expectations based on the initial update expectation.

The publisher 554 can determine if an inventory report should be included in the recent inventory reports that are returned to the client 552. For example, assume the publisher 554 has chosen 20 minutes for the reporting window. If a request is received from the client 552 for a particular location and the most recent report from that location was generated 21 minutes ago, whether or not that report is returned to the client 552 can be determined by the publisher 554 based on a variety of factors, such as the age of the report and/or the length of the reporting window.

The publisher 554 can also take steps to try to eliminate duplicate inventory reports that may exist for parking locations within a reporting window. Eliminating duplicate inventory reports can include removing portions of older reports that are duplicative with the most recent inventory reports and/or removing entire inventor reports. Such removal of duplicate inventory reports can provide greater efficiency in the interaction between the client 552 and the publisher 554 and can reduce the amount of information that is transmitted in response to inventory report requests.

Figure 6:
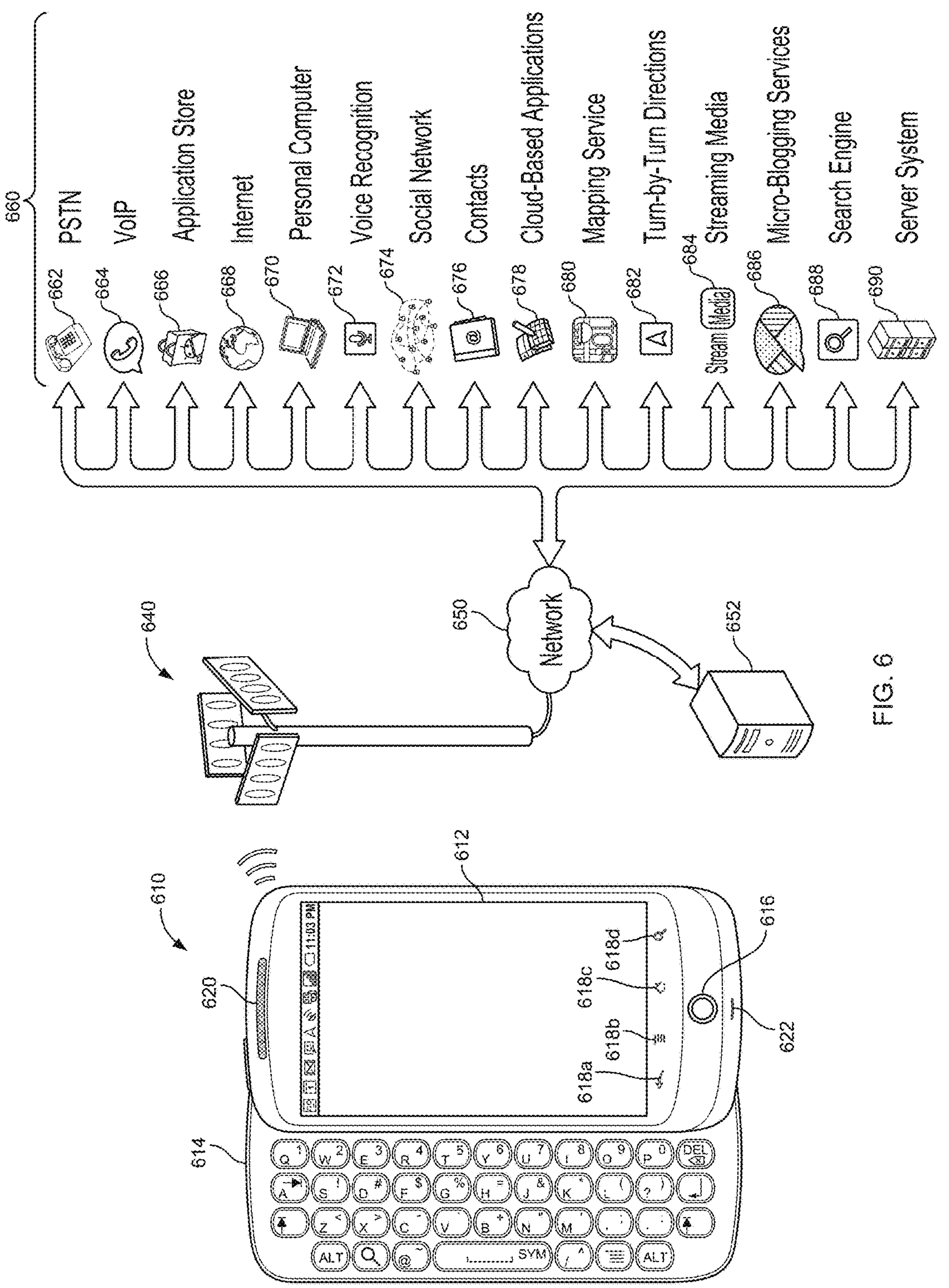
FIG. 6 is a conceptual diagram of a system that may be used to implement the systems and methods described in this document.

Referring now to FIG. 6, a conceptual diagram of a system that may be used to implement the systems and methods described in this document is illustrated. In the system, mobile computing device 610 can wirelessly communicate with base station 640, which can provide the mobile computing device wireless access to numerous hosted services 660 through a network 650.

In this illustration, the mobile computing device 610 is depicted as a handheld mobile telephone (e.g., a smartphone, or application telephone) that includes a touchscreen display device 612 for presenting content to a user of the mobile computing device 610 and receiving touch-based user inputs. Other visual, auditory, and tactile output components may also be provided (e.g., LED lights, a speaker for providing tonal, voice-generated, or recorded output, or vibrating mechanisms for tactile output), as may various different input components (e.g., keyboard 614, physical buttons, trackballs, accelerometers, gyroscopes, and magnetometers).

Example visual output mechanism in the form of display device 612 may take the form of a 3.7 or 4.3 inch LED or AMOLED display with resistive or capacitive touch capabilities, for displaying video, graphics, images, and text, and coordinating user touch inputs locationally with the displayed information so that user contact above a displayed item may be associated with the item by the device 610. The mobile computing device 610 may take alternative forms also, including as a laptop computer, a tablet or slate computer, a personal digital assistant, an embedded system (e.g., a car navigation system), a desktop personal computer, or a computerized workstation.

An example mechanism for receiving user-input includes keyboard 614, which may be a full qwerty keyboard or a traditional keypad that includes keys for the digits '0-9', '*', and '#.' The keyboard 614 receives input when a user physically contacts or depresses a keyboard key. User manipulation of a trackball 616 or interaction with a trackpad enables the user to supply directional and rate of rotation information to the mobile computing device 610 (e.g., to manipulate a position of a cursor on the display device 612).

The mobile computing device 610 may be able to determine a position of physical contact with the touchscreen display device 612 (e.g., a position of contact by a finger or a stylus). Using the touchscreen 612, various "virtual" input mechanisms may be produced, where a user interacts with a graphical user interface element depicted on the touchscreen 612 by contacting the graphical user interface element. An example of a "virtual" input mechanism is a "software keyboard," where a keyboard is displayed on the touchscreen and a user selects keys by pressing a region of the touchscreen 612 that corresponds to each key.

The mobile computing device 610 may include mechanical or touch sensitive buttons 618*a-d*. Additionally, the mobile computing device may include buttons for adjusting volume output by the one or more speakers 620, and a button for turning the mobile computing device on or off. A microphone 622 allows the mobile computing device 610 to convert audible sounds into an electrical signal that may be digitally encoded and stored in computer-readable memory, or transmitted to another computing device. The mobile computing device 610 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include the ANDROID mobile device platform; APPLE IPHONE/MAC OS X operating systems; MICROSOFT WINDOWS 6/WINDOWS MOBILE operating systems; SYMBIAN operating system; RIM BLACKBERRY operating system; PALM WEB operating system; a variety of UNIX-flavored operating systems; or a proprietary operating system for computerized devices. The operating system may provide a platform for the execution of application programs that facilitate interaction between the computing device and a user.

The mobile computing device 610 may present a graphical user interface with the touchscreen 612. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 604. User-selection of the button may invoke the pre-defined action.

In some examples, the operating system provides a "desktop" user interface that is displayed upon turning on the mobile computing device 610, activating the mobile computing device 610 from a sleep state, upon "unlocking" the mobile computing device 610, or upon receiving user-selection of the "home" button 618*c*. The desktop graphical interface may display several icons that, when selected with user-input, invoke corresponding application programs. An invoked application program may present a graphical interface that replaces the desktop graphical interface until the application program terminates or is hidden from view.

User-input may manipulate a sequence of mobile computing device 610 operations. For example, a single-action user input (e.g., a single tap of the touchscreen, swipe across the touchscreen, contact with a button, or combination of these at a same time) may invoke an operation that changes a display of the user interface. Without the user-input, the user interface may not have changed at a particular time. For example, a multi-touch user input with the touchscreen 612 may invoke a mapping application to "zoom-in" on a location, even though the mapping application may have by default zoomed-in after several seconds.

The desktop graphical interface can also display "widgets." A widget is one or more graphical interface elements that are associated with an application program that has been executed, and that display on the desktop content controlled by the executing application program. A widget's application program may start with the mobile telephone. Further, a widget may not take focus of the full display. Instead, a widget may only "own" a small portion of the desktop, displaying content and receiving touchscreen user-input within the portion of the desktop.

The mobile computing device 610 may include one or more location-identification mechanisms. A location-identification mechanism may include a collection of hardware and software that provides the operating system and application programs an estimate of the mobile telephone's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by "checking in" to a location).

The mobile computing device 610 may include other application modules and hardware. A call handling unit may receive an indication of an incoming telephone call and provide a user capabilities to answer the incoming telephone call. A media player may allow a user to listen to music or play movies that are stored in local memory of the mobile computing device 610. The mobile telephone 610 may include a digital camera sensor, and corresponding image and video capture and editing software. An Internet browser may enable the user to view content from a web page by typing in an addresses corresponding to the web page or selecting a link to the web page.

The mobile computing device 610 may include an antenna to wirelessly communicate information with the base station 640. The base station 640 may be one of many base stations in a collection of base stations (e.g., a mobile telephone cellular network) that enables the mobile computing device 610 to maintain communication with a network 650 as the mobile computing device is geographically moved. The computing device 610 may alternatively or additionally communicate with the network 650 through a Wi-Fi router or a wired connection (e.g., Ethernet, USB, or FIREWIRE). The computing device 610 may also wirelessly communicate with other computing devices using BLUETOOTH protocols, or may employ an ad-hoc wireless network.

A service provider that operates the network of base stations may connect the mobile computing device 610 to the network 650 to enable communication between the mobile computing device 610 and other computerized devices that provide services 660. Although the services 660 may be provided over different networks (e.g., the service provider's internal network, the Public Switched Telephone Network, and the Internet), network 650 is illustrated as a single network. The service provider may operate a server system 652 that routes information packets and voice data between the mobile computing device 610 and computing devices associated with the services 660.

The network 650 may connect the mobile computing device 610 to the Public Switched Telephone Network (PSTN) 662 in order to establish voice or fax communication between the mobile computing device 610 and another computing device. For example, the service provider server system 652 may receive an indication from the PSTN 662 of an incoming call for the mobile computing device 610. Conversely, the mobile computing device 610 may send a communication to the service provider server system 652 initiating a telephone call with a telephone number that is associated with a device accessible through the PSTN 662.

The network 650 may connect the mobile computing device 610 with a Voice over Internet Protocol (VoIP) service 664 that routes voice communications over an IP network, as opposed to the PSTN. For example, a user of the mobile computing device 610 may invoke a VoIP application and initiate a call using the program. The service provider server system 652 may forward voice data from the call to a VoIP service, which may route the call over the internet to a corresponding computing device, potentially using the PSTN for a final leg of the connection.

An application store 666 may provide a user of the mobile computing device 610 the ability to browse a list of remotely stored application programs that the user may download over the network 650 and install on the mobile computing device 610. The application store 666 may serve as a repository of applications developed by third-party application developers. An application program that is installed on the mobile computing device 610 may be able to communicate over the network 650 with server systems that are designated for the application program. For example, a VoIP application program may be downloaded from the Application Store 666, enabling the user to communicate with the VoIP service 664.

The mobile computing device 610 may access content on the Internet 668 through network 650. For example, a user of the mobile computing device 610 may invoke a web browser application that requests data from remote computing devices that are accessible at designated universal resource locations. In various examples, some of the services 660 are accessible over the internet The mobile computing device may communicate with a personal computer 670. For example, the personal computer 670 may be the home computer for a user of the mobile computing device 610. Thus, the user may be able to stream media from his personal computer 670. The user may also view the file structure of his personal computer 670, and transmit selected documents between the computerized devices.

A voice recognition service 672 may receive voice communication data recorded with the mobile computing device's microphone 622, and translate the voice communication into corresponding textual data. In some examples, the translated text is provided to a search engine as a web query, and responsive search engine search results are transmitted to the mobile computing device 610.

The mobile computing device 610 may communicate with a social network 674. The social network may include numerous members, some of which have agreed to be related as acquaintances. Application programs on the mobile computing device 610 may access the social network 674 to retrieve information based on the acquaintances of the user of the mobile computing device. For example, an "address book" application program may retrieve telephone numbers for the user's acquaintances. In various examples, content may be delivered to the mobile computing device 610 based on social network distances from the user to other members. For example, advertisement and news article content may be selected for the user based on a level of interaction with such content by members that are "close" to the user (e.g., members that are "friends" or "friends of friends").

The mobile computing device 610 may access a personal set of contacts 676 through network 650. Each contact may identify an individual and include information about that individual (e.g., a phone number, an email address, and a birthday). Because the set of contacts is hosted remotely to the mobile computing device 610, the user may access and maintain the contacts 676 across several devices as a common set of contacts.

The mobile computing device 610 may access cloud-based application programs 678. Cloud-computing provides application programs (e.g., a word processor or an email program) that are hosted remotely from the mobile computing device 610, and may be accessed by the device 610 using a web browser or a dedicated program. Example cloud-based application programs include GOOGLE DOCS word processor and spreadsheet service, GOOGLE GMAIL webmail service, and PICASA picture manager.

Mapping service 680 can provide the mobile computing device 610 with street maps, route planning information, and satellite images. An example mapping service is GOOGLE MAPS. The mapping service 680 may also receive queries and return location-specific results. For example, the mobile computing device 610 may send an estimated location of the mobile computing device and a user-entered query for "pizza places" to the mapping service 680. The mapping service 680 may return a street map with "markers" superimposed on the map that identify geographical locations of nearby "pizza places."

Turn-by-turn service 682 may provide the mobile computing device 610 with turn-by-turn directions to a user-supplied destination. For example, the turn-by-turn service 682 may stream to device 610 a street-level view of an estimated location of the device, along with data for providing audio commands and superimposing arrows that direct a user of the device 610 to the destination.

Various forms of streaming media 684 may be requested by the mobile computing device 610. For example, computing device 610 may request a stream for a pre-recorded video file, a live television program, or a live radio program. Example services that provide streaming media include YOUTUBE and PANDORA.

A micro-blogging service 686 may receive from the mobile computing device 610 a user-input post that does not identify recipients of the post. The micro-blogging service 686 may disseminate the post to other members of the micro-blogging service 686 that agreed to subscribe to the user.

A search engine 688 may receive user-entered textual or verbal queries from the mobile computing device 610, determine a set of internet-accessible documents that are responsive to the query, and provide to the device 610 information to display a list of search results for the responsive documents. In examples where a verbal query is received, the voice recognition service 672 may translate the received audio into a textual query that is sent to the search engine.

These and other services may be implemented in a server system 690. A server system may be a combination of hardware and software that provides a service or a set of services. For example, a set of physically separate and networked computerized devices may operate together as a logical server system unit to handle the operations necessary to offer a service to hundreds of individual computing devices.

In various implementations, operations that are performed "in response" to another operation (e.g., a determination or an identification) are not performed if the prior operation is unsuccessful (e.g., if the determination was not performed). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

Figure 7:
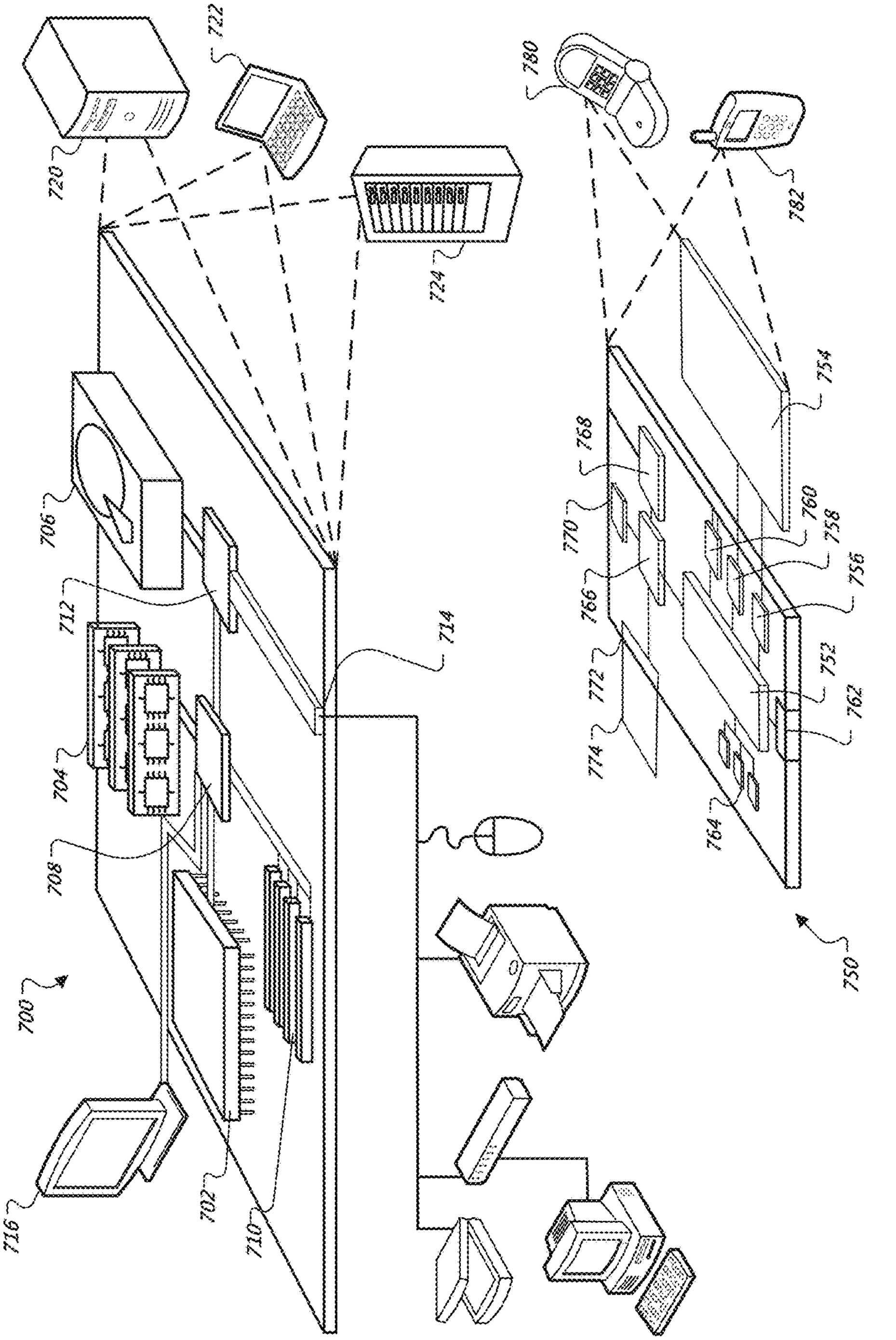
FIG. 7 is a block diagram of computing devices that may be used to implement the systems and methods described in this document, as either a client or as a server or plurality of servers.

FIG. 7 is a block diagram of computing devices 700, 750 that may be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk. Additionally computing device 700 or 750 can include Universal Serial Bus (USB) flash drives. The USB flash drives may store operating systems and other applications. The USB flash drives can include input/output components, such as a wireless transmitter or USB connector that may be inserted into a USB port of another computing device.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a nonhackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752 that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method, comprising:

identifying, by a first computing system, a geographic location of the first computing system;

sending, by the first computing system and for receipt by a remote, second computing system, a request for information that identifies available parking locations that are relevant to the geographic location;

receiving, by the first computing system and as having been sent by the second computing system in response to the first computing system having sent the request for the information that identifies the available parking locations, information that identifies a first parking location as being available and a second parking location as being available; and generating, by the first computing system in response to the first computing system having received the information that identifies the first parking location as being available and the second parking location as being available, a user interface that includes:

(i) a first indication that the first parking location is available, and (ii) a second indication that the second parking location is available.

2. The computer-implemented method of claim 1, wherein the generated user interface includes:

(i) the first indication positioned on a map in the user interface at a location of the first parking location, and (ii) the second indication positioned on the map at a location of the second parking location.

3. The computer-implemented method of claim 2, wherein the generated user interface includes:

(i) an indication of a first number of multiple parking spots that are available at the first parking location, and (ii) an indication of a second number of multiple parking spots that are available at the second parking location.

4. The computer-implemented method of claim 2, wherein the generated user interface includes:

(i) an indication of a first price to park at the first parking location, and (ii) an indication of a second price to park at the second parking location, the first price being different than the second price.

5. The computer-implemented method of claim 1, wherein:

information that identifies that the first parking location is available was provided to the second computing system from a first organization that manages the first parking location; and information that identifies that the second parking location is available was provided to the second computing system from a second organization that manages the second parking location.

6. The computer-implemented method of claim 1, further comprising:

receiving, by the first computing system, user input that selects a particular geographic location on a map as being a location of a particular parking location that is available;

sending, by the first computing system, an indication of the particular geographic location for receipt by the second computing system, so as to cause the second computing system to provide an indication to other computing devices that the particular geographic location is available.

7. The computer-implemented method of claim 1, wherein:

information that identifies that the first parking location is available was provided to the second computing system from a first mobile computing device in response to user-input tagging a first location on a map as being a location of an available parking location; and information that identifies that the second parking location is available was provided to the second computing system from a second mobile computing device in response to user-input tagging a different, second location on a map as being a location of an available parking location.

8. The computer-implemented method of claim 7, wherein the generated user interface includes:

(i) an indication of a first age of the information that identifies that the first parking location is available, and (ii) a different indication of a different, second age of the information that identifies that the second parking location is available.

9. The computer-implemented method of claim 8, wherein:

the indication of the first age includes a user interface element of a first color that is positioned on a map in the user interface at a location of the first parking location; and the indication of the second age includes a user interface element of a second color that is positioned on the map in the user interface at a location of the second parking location.

10. A computerized system, comprising:

one or more processors; and one or more non-transitory computer-readable devices including instructions that, when executed by the one or more processors, cause performance of operations that comprise:

identifying, by a first computing system, a geographic location of the first computing system;

sending, by the first computing system and for receipt by a remote, second computing system, a request for information that identifies available parking locations that are relevant to the geographic location;

receiving, by the first computing system and as having been sent by the second computing system in response to the first computing system having sent the request for the information that identifies the available parking locations, information that identifies a first parking location as being available and a second parking location as being available; and generating, by the first computing system in response to the first computing system having received the information that identifies the first parking location as being available and the second parking location as being available, a user interface that includes:

(i) a first indication that the first parking location is available, and (ii) a second indication that the second parking location is available.

11. The computerized system of claim 10, wherein the generated user interface includes:

(i) the first indication positioned on a map in the user interface at a location of the first parking location, and (ii) the second indication positioned on the map at a location of the second parking location.

12. The computerized system of claim 11, wherein the generated user interface includes:

(i) an indication of a first number of multiple parking spots that are available at the first parking location, and (ii) an indication of a second number of multiple parking spots that are available at the second parking location.

13. The computerized system of claim 11, wherein the generated user interface includes:

(i) an indication of a first price to park at the first parking location, and (ii) an indication of a second price to park at the second parking location, the first price being different than the second price.

14. The computerized system of claim 10, wherein:

information that identifies that the first parking location is available was provided to the second computing system from a first organization that manages the first parking location; and information that identifies that the second parking location is available was provided to the second computing system from a second organization that manages the second parking location.

15. The computerized system of claim 10, wherein the operations further comprise:

receiving, by the first computing system, user input that selects a particular geographic location on a map as being a location of a particular parking location that is available;

sending, by the first computing system, an indication of the particular geographic location for receipt by the second computing system, so as to cause the second computing system to provide an indication to other computing devices that the particular geographic location is available.

16. The computerized system of claim 10, wherein:

information that identifies that the first parking location is available was provided to the second computing system from a first mobile computing device in response to user-input tagging a first location on a map as being a location of an available parking location; and information that identifies that the second parking location is available was provided to the second computing system from a second mobile computing device in response to user-input tagging a different, second location on a map as being a location of an available parking location.

17. The computerized system of claim 16, wherein the generated user interface includes:

(i) an indication of a first age of the information that identifies that the first parking location is available, and (ii) a different indication of a different, second age of the information that identifies that the second parking location is available.

18. The computerized system of claim 17, wherein:

the indication of the first age includes a user interface element of a first color that is positioned on a map in the user interface at a location of the first parking location; and the indication of the second age includes a user interface element of a second color that is positioned on the map in the user interface at a location of the second parking location.

* * * * *